3,350,300
RECOVERY OF SALT-FREE WATER FROM BRINE

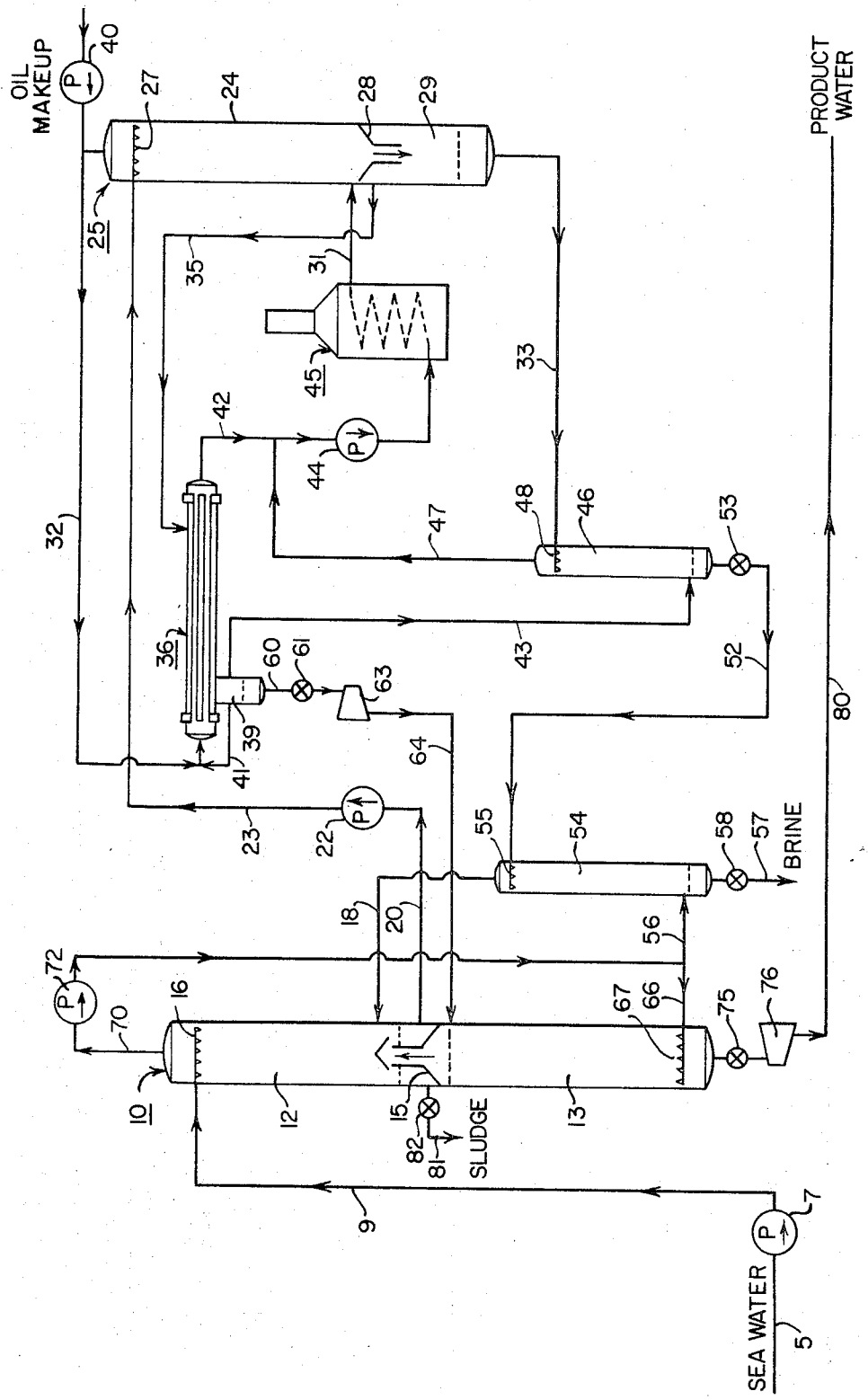

Howard V. Hess, Glenham, and Frank E. Guptill, Jr., Fishkill, N.Y., assignors to Texaco Inc., New York, N.Y., a corporation of Delaware
Filed Dec. 16, 1963, Ser. No. 330,727
12 Claims. (Cl. 210—22)

The present invention relates to a novel process and apparatus for separating fresh water from brine. The process is applicable to the recovery of salt-free water from brines and to the concentration of various brines for the recovery of soluble salts contained therein.

In one of its more specific aspects, the present invention is concerned with a process for separating water from brine wherein a hot hydrocarbon liquid under pressure is brought into contact with heated brine to form a complex substantially free from inorganic compounds with water from the brine, the complex is separated from the residual brine, and the separated complex decomposed into its constituents whereby water is liberated therefrom. The term "brine" is used in a broad sense to denote the entire range of concentrations of aqueous solutions of water soluble inorganic compounds, for example, natural saline water containing sodium chloride, including brackish water, sea water, and saturated or nearly saturated brines, such as the brine in The Great Salt Lake or brines obtained from wells. In addition to sodium chloride-containing solutions, other brines to which the pr&ocess may be applied include aqueous solutions of dissolved mineral salts, for example, halides, carbonates and sulfates of sodium, potassium, lithium, calcium, magnesium, zinc and copper.

The present invention involves a novel desalination process which is dependent upon contact of hot brine with a hot hydrocarbon liquid characterized by the property of extracting a greater amount of water at a high temperature (e.g., at a temperature of 500° F. or above) than at a lower temperature, whereby water is extracted from the brine by the hydrocarbon and forms a complex which is immiscible with the residual brine and may be separated therefrom by gravity. After separation from the residual brine, the complex is decomposed by reducing the temperature sufficiently below the extraction temperature to cause the hydrocarbon and water to separate from one another as two liquid phases; the water phase or the residual brine may be recovered as product and the hydrocarbon phase recycled to the extraction zone. The basic process is disclosed in the copending U.S. patent application of Howard V. Hess, Ser. No. 144,240, filed Oct. 10, 1961, now abandoned. The present application is directed to improvements in the basic process.

The term "complex" is used herein to designate the solution of water in hydrocarbon liquid, especially the extract leaving the extraction zone, since it is not entirely certain at this time whether it is a true solution of water in hydrocarbon liquid or a hydrocarbon solution containing a hydrate of the water and hydrocarbon.

For greatest efficiency the present process should be operated at a temperature above 500° F. for the extraction step, after which the temperature is reduced below the extraction temperature for the phase separation step, advantageously by at least 50° below the extraction temperature to assure breaking out the major part of the water. When using aliphatic hydrocarbons, somewhat greater extraction efficiency is obtained if the temperature is kept above 550° F.

By way of illustration, n-decane has the property of extracting 22.2% its weight of water at 575° F., 9% at 550° F., and only 3.3% at 500° F. Consequently, with the extraction process operating at 575° F., and the decomposition step at 500° F., there is a recovery of water in the amount of about 19 percent of the n-decane.

The operating pressure of the extraction step must be sufficiently high to maintain the brine in liquid condition at the operating temperature, normally greater than 1000 p.s.i.g. and sometimes as high as 3000 p.s.i.g.

Normally liquid hydrocarbons are generally suitable for use in the process of this invention. Hydrocarbons and mixtures of hydrocarbons containing from 6 to 30 carbon atoms per molecule may be used. Hydrocarbons of 8 to 20 carbon atoms, particularly, 9 ot 12, per molecule are preferred. Various petroleum fractions including kerosene, naphtha, odorless spirits, gasoline, and lubricating oils may be used in the process. Examples of individual hydrocarbon types which can be used in the process of the present invention, either alone or in admixture with one another, are the aliphatic hydrocarbons, including hexane, 2,3-dimethylbutane, heptanes, octanes, isooctane, nonanes, decanes, propylene tetramer, hexadecane, 2-methyl-1-pentene, etc.; alicyclic hydrocarbons, e.g., methylcyclopentane, cyclohexane, methylcyclohexane, dimethylcyclohexane, ethylcyclohexane, tetralin, isopropylcyclohexane, cyclohexene, pinene, etc.; and aromatic hydrocarbons, e.g., benzene, cumene, xylenes, methylnaphthalenes, etc.

The preferred hydrocarbons are those which are stable under the temperature and pressure conditions employed in the process, for example, 550° F. to 650° F. and 1000 to 3000 p.s.i.g. The preferred hydrocarbons should have low toxicity and low solubility in water at ordinary temperatures and atmospheric pressure. In general, the saturated hydrocarbons are preferred for use in the process.

Preferred petroleum fractions useful in the present process include normal paraffin hydrocarbons containing 10 to 12 carbon atoms per molecule; isoparaffin hydrocarbons of 12 carbon atoms per molecule, e.g., the bottoms fraction obtained from alkylation of butylenes with isobutane; aromatic hydrocarbons of 9 to 10 carbon atoms per molecule, e.g., aromatic hydrocarbons obtained by alkylation of benzene or toluene with propylene; propylene tetramer; a gasoline fraction containing hydrocarbons of 10 to 12 carbon atoms per molecule; and naphthenes containing 9 to 10 carbon atoms per molecule.

Some petroleum fractions may include impurities, e.g., sulfur compounds, but such impurities do not normally exist in sufficient quantity to adversely affect the use of the petroleum fractions in the process of the invention. These impurities tend to be removed from the hydrocarbons after a short period of time.

The figure illustrates diagrammatically an arrangement of apparatus for carrying out the process of this invention.

With reference to the figure, sea water at ambient temperature, for example 70° F., is drawn from a suitable source of supply through line 5 by pump 7 where its pressure is raised to an intermediate pressure, suitably in the range of 500 to 1000 p.s.i.g., and introduced through line 9 into the upper end of column 10. Column 10 is a vertical, cylindrical vessel divided into a brine heater section 12 in its upper part and a product water cooler section 13 in its lower part by a trap tray 15. The raw brine enters near the top of section 12 through a suitable distributor or sparger 16 which disperses it into hydrocarbon liquid.

The brine heater section 12 of column 10 is maintained full of liquid, with hydrocarbon liquid as the continuous phase and brine as the discontinuous phase. Brine from distributor 16 flows downwardly in the direct contact with upwardly flowing hot hydrocarbon liquid from line 18 and from the upper part of water cooler section 13 as explained in more detail hereinafter.

Preheated brine is withdrawn from the lower part of brine heater section 12 of column 10 through line 20. The pressure of the brine is increased to extraction pressure suitably in the range of 1000 to 2500 p.s.i.g., by pump 22 and passed through line 23 to brine heater section 24 of column 25. In brine heater 24, the brine is further heated to the desired extraction temperature by direct contercurrent contact with hot hydrocarbon liquid. Brine from line 23 is introduced into the upper part of brine heater 24 through sparger 27 and flows downwardly through heater 24 in direct countercurrent contact with upwardly flowing hot hydrocarbon liquid. A downcomer tray 28 in column 25 separates heater section 24 from a separator section 29 in the lower part of column 25. The brine is heated to the desired extraction temperature, for example, at a temperature in the range of 550 to 650° F. by direct heat exchange with hot hydrocarbon liquid introduced to the lower part of heater section 24 through line 31. Sufficient heated hydrocarbon liquid is admitted through line 31 to supply both the heat required to heat the brine to extraction temperature and the hydrocarbon liquid necessary to form the complex with water from the perheated brine.

The hydrocarbon from line 31 which is used for direct countercurrent heat exchange with brine in heater 24 is discharged from the top of column 25 through line 32. The remainder of the hot hydrocarbon from line 31 forms the complex. Preheated brine and complex flow through downcomer 28 into separator 29 where residual concentrated brine separtes from the complex and accumulates in the bottom of column 25 from which it is discharged through line 33.

The complex is withdrawn from the upper part of separator 29 through line 35 and passed through the shell side of a shell and tube type heat exchanger 36 where it is cooled by an amount sufficient to liberate water from the complex, for example, by cooling to a temperature below 500° F., by indirect heat exchange with relatively cool hydrocarbon liquid supplied to the tube side of heat exchanger 36 through line 32 from the top of column 25. Cooling of the complex in the heat exchanger releases water whereby two immiscible liquid phases are formed. One of these phases is a water phase which comprises fresh water containing only a very small amount of hydrocarbon, for example, less than 1 percent by weight. The other is a hydrocarbon phase which comprises hydrocarbon containing a minor amount of water, for example, less than 10 percent by weight.

The cooled hydrocarbon and water phases are discharged from heat exchanger 36 into separator 39. Make-up hydrocarbon liquid to replace losses from the system is added, as required, to line 32 by means of pump 40. Part of the hydrocarbon liquid phase is withdrawn from separator 39 through line 41, mixed with cool hydrocarbon liquid from line 32, and passed through the tubes of heat exchanger 36 effecting cooling of complex from line 35. The hydrocarbon liquid is discharged from the heat exchanger tubes through line 42 to pump 44 and passed to heater 45 and line 31 to column 25.

Concentrated brine from the bottom of separator 29 is discharged through line 33 into the upper part of brine cooler 46 where it is contacted with cool hydrocarbon liquid from separator 39 through line 43. Brine cooler 46 is provided with a distributor or sparger 48 to disperse the hot brine into a continuous phase of hydrocarbon liquid entering the lower part of brine cooler 46 through line 43. In the brine cooler 46, direct heat exchange between concentrated hot brine from line 33 and cooler hydrocarbon liquid from line 43 effects cooling of the brine and heating of the hydrocarbon liquid. The resulting heated hydrocarbon liquid is drawn from the top of brine cooler 46 through line 47 by pump 44, mixed with hydrocarbon liquid from line 42, and passed through heater 45 where it is heated for recirculation to column 25.

Brine collected at the bottom of brine cooler 46 is discharged through line 52 as controlled by valve 53 to the top of a second brine cooler 54. Brine cooler 54 is a vertical, cylindrical column provided with a sparger 55 at the upper part of the column to distribute the brine in the hydrocarbon liquid. Cool hydrocarbon liquid is introduced into the lower part of brine cooler 54 through line 56. As in the other liquid-liquid heat exchangers, hydrocarbon liquid is maintained as the continuous phase in brine cooler 54. Cooled, concentrated brine is discharged through line 57 as controlled by valve 58. Heated hydrocarbon liquid is discharged from brine cooler 54 through line 18 to brine preheater 12.

The water phase separated from the hydrocarbon phase in separator 39 is withdrawn through line 60, as controlled by valve 61, and passed to a turbine 63. In passing through turbine 63, the pressure of the water is reduced to the pressure of column 10. Water from turbine 63 flows through line 64 to the upper part of water cooler section 13 of column 10. In the water cooler 13, desalted water flows downwardly countercurrent to ascending relatively cool hydrocarbon liquid supplied to the lower part of the column through line 66 to a sparger 67. Water cooler 13 is operated liquid full, with water as the continuous phase in the heat exchange portion of the cooler. In water cooler 13, the water is cooled to a temperature below its boiling point, and preferably to a temperature near that of the raw brine, e.g., in the range of 50 to 150° F., while the hydrocarbon liquid is heated, suitably to a temperature in the range of 450 to 500° F.

The hydrocarbon liquid heated in cooler 13 flows up through trap tray 15 into the lower part of brine preheater 12. Heated hydrocarbon liquid, suitably at a temperature in the range of 450 to 500° F., from brine cooler 54 also enters the lower part of brine preheater 12 through line 18 from brine cooler 54. The hydrocarbon liquid flows upwardly through brine heater 12 countercurrent to the flow of brine introduced through line 9 and is cooled to a temperature near that of the raw brine. The cooled hydrocarbon liquid is withdrawn from the top of brine heater 12 through line 70 by means of pump 72 and supplied to water cooler 13 through line 66 and to brine cooler 54 through line 56.

Cooled, desalted water is discharged from the lower end of water coler 13 in column 10 through a suitable control valve 75 to turbine 76. The water pressure is reduced from the pressure in column 10 to atmospheric pressure or to storage presure by means of turbine 76. Part of the power requirements of the plant is supplied by turbine 76. Water recovered from the brine is discharged through line 80 as product of the process.

In brine heater section 12 of column 10, the sea water or brine is heated to a temperature above 300° F., preferably to a temperature in the range of 450 to 500° F. Heating of the brine causes calcuim carbonate precipitation in the form of slude in the brine heater 12. This sludge is concentrated on trap tray 15 and drawn off with a part of the sea water, as required, through line 81 as controlled by valve 82. Removal of calcium carbonate in this manner eliminates, or substantially eliminates, scale formation in lines and equipment. Sludge may be recycled, as desired, for seeding, to line 9.

Although water cooler 13 is described and illustrated for operation with water as the continuous phase, it can be operated with hydrocarbon as the continuous phase. In this event, the level of the water-hydrocarbon interface is maintained at or near the point of introduction of hydrocarbon to the water cooler and the sparger is employed for distributing the water into the hydrocarbon.

As a specific example of the operation of this process, flow rates and operating conditions are given for a plant for the production of ten million gallons per day of fresh water from the sea water. In this specific example, an aromatic hydrocarbon fraction of 9 to 10 carbon atoms per molecule obtained from Udex extract, an aromatic fraction obtained on treating petroleum naphtha with ethylene glycol, is employed as the hydrocarbon liquid. Sea water containing 3.5 weight percent salt is treated for the recovery of fresh water.

With reference to the figure, sea water at 70° F. is supplied to brine preheater 12 at 680 p.s.i.g. at the rate of 2,001 tons per hour (t./hr.). The hydrocarbon is supplied to brine preheater 12 through line 18 at the rate of 365 t./hr. at 470° F. and through trap tray 15 at the rate of 3,217 t./hr. at 470° F., together with 203 t./hr. of fresh water from water cooler 13. Preheated brine at 460° F. is drawn from the bottom of brine heater 12 through line 20 at the rate of 2,202 t./hr. together with 17 t./hr. of hydrocarbon. The increase in quantity of brine in brine heater 12 results from dilution of the incoming sea water with recycled fresh water entering with the hydrocarbon feed to the brine heater. The preheated brine at 460° F. is raised to a pressure of 1650 p.s.i.g. by pump 22 and introduced into the upper part of brine heater 24 where it is contacted with hydrocarbon at 600° F. from line 31. The hot hydrocarbon is introduced into the lower part of brine heater 24 from line 31 at the rate of 5,368 t./hr. containing 322.5 t./hr. of water. Part of the hydrocarbon introduced through line 31 forms a complex with water from the brine. The remainder supplies the heat necessary to raise the temperature of the brine from 460° F. to extraction temperature of 590° F. Hydrocarbon liquid passing up through heater 24 is cooled to 470° F. and is withdrawn from the top of the heater through line 32 at the rate of 3,315.5 t./hr., together with 189 t./hr. of water.

Extract or complex of hydrocarbon and fresh water formed in the lower part of heater 24 flows down through downcomer tray 28 into separator 29 at the rate of 2,053.5 t./hr. and is withdrawn through line 35 at 590° F. at the rate of 4,139 t./hr. as an extract comprising 50 percent hydrocarbon and 50 percent water by weight. The hydrocarbon-water extract withdrawn from separator section 29 of column 25 at 590° F. is passed to heat exchanger 36 where it is cooled from 590° F. to 480° F. by indirect heat exchange with hydrocarbon from brine heater 24 and with hydrocarbon separated from the extract in separator 39.

Cooling of the hydrocarbon-water extract in heat exchanger 36 at 480° F. liberates water from the extract. Water, separated from the hydrocarbon liquid by gravity in separator 39 is discharged through line 60 to turbine 63 at the rate of 1,936 t./hr. together with 17 t./hr. of hydrocarbon. In turbine 63, the pressure of the water is reduced to 680 p.s.i.g. The water at 480° F. is passed through line 64 to the upper part of water cooler 13. In water cooler 13, the water is cooled from 480° F. to 90° F. by direct contact with hydrocarbon liquid at 80° F. introduced to the lower part of water cooler 13 at the rate of 3,200 t./hr. together with 2 t./hr. of water. The cooled water at 90° F. is discharged through turbine 76 to the line 80 as product at the rate of 1,735 t./hr.

The water product in line 80 is substantially completely free from hydrocarbon liquid as a result of cooling in cooler 13. Trace amounts of hydrocarbon can be removed from the product water to improve its potability, e.g., by filtration through charcoal, not illustrated in the drawing.

Part of the separated hydrocarbon phase from separator 39 at 480° F. is passed through line 41 at the rate of 1,722.5 t./hr., together with 112 t./hr. of water. The resulting mixture from lines 32 and 41 enters the heat exchanger 36 at 473° F. and is heated to 585° F. in the heat exchanger. This mixture is passed through line 42 at the rate of 5,038 t./hr., together with 301 t./hr. of water and is mixed with 330 t./hr. of hydrocarbon from brine cooler 46 containing 21.5 t./hr. of water at a stream temperature of 580° F. The resulting mixture is passed through heater 45 where its temperature is raised to 600° F.

Residual brine separated from the hydrocarbon-water extract in separator section 29 of column 25 at 590° F. is passed through line 33 at the rate of 266 t./hr. to brine cooler 46. In brine cooler 46, the residual brine is contacted with hydrocarbon at 480° F. from separator 39 entering the lower part of the cooler through line 43 at the rate of 330 t./hr., together with 21.5 t./hr. of water. Residual brine at 490° F. is discharged from brine cooler 46 through valve 53, where its pressure is reduced, and supplied to brine cooler 54 at the rate of 266 t./hr. where it is contacted with 365 t./hr. of hydrocarbon at 80° F., heating the hydrocarbon to 470° F. and cooling the brine to 115° F. Residual brine is discharged from brine cooler 54 through line 57 at the rate of 266 t./hr. at 115° F. The hydrocarbon liquid, heated from 80° F. to 470° F. in brine cooler 54 at the rate of 365 t./hr. is introduced to the lower part of brine heater 12 through line 18.

Hydrocarbon liquid at 80° F. is withdrawn from the top of brine heater 12 at the rate of 3,565 t./hr. together with 2 t./hr. of water by pump 72 and passed to water cooler 13 through line 66 at the rate of 3,200 t./hr. of hydrocarbon liquid, and to brine cooler 54 through line 56 at the rate of 365 t./hr.

We claim:

1. A process for extracting water from brine comprising passing relatively cool brine into direct countercurrent contact with relatively hot hydrocarbon liquid in a first contacting zone whereby said hydrocarbon is cooled and said brine is heated to an elevated temperature at a pressure sufficient to maintain said brine and said hydrocarbon in liquid phase, passing resulting preheated brine at an increased pressure into direct countercurrent contact with hot hydrocarbon liquid in a second contacting zone whereby said brine is further heated to a temperature sufficient to form an extract consisting essentially of salt-free water in hydrocarbon under sufficient pressure to maintain said brine in liquid phase, separating residual brine containing an increased salt concentration from said extract, withdrawing said extract from said second contacting zone and passing said extract at said increased pressure through an indirect heat exchange zone in indirect countercurrent heat exchange with cooled hydrocarbon liquid from said second contacting zone whereby said hydrocarbon liquid is heated and said extract is cooled by an amount sufficient to liberate relatively salt-free water from said extract and form separate water and hydrocarbon liquid phases, further heating said hydrocarbon liquid and returning it to said second contacting zone, withdrawing said hydrocarbon liquid phase separated from said extract and returning at least a part thereof to said indirect heat exchange zone in admixture with said cooled hydrocarbon liquid supplied thereto, and withdrawing water separated from said extract.

2. A process according to claim 1 wherein said brine is heated to a temperature in the range of 450 to 500° F. by said direct countercurrent contact with hot hydrocarbon liquid in said first contacting zone.

3. A process according to claim 1 wherein said water is separated from said hydrocarbon liquid phase at a temperature in the range of 450 to 500° F.

4. A process according to claim 3 wherein said residual brine is separated from said extract at a temperature in the range of 550 to 650° F.

5. A process according to claim 4 wherein said hydrocarbon liquid phase separated from said water is admixed with cool hydrocarbon liquid from said second contacting zone and passed in countercurrent indirect heat exchange with extract from said second contacting zone.

6. A process according to claim 5 wherein said hydrocarbon liquid is heated by indirect heat exchange with said extract to a temperature in the range of 550 to 650° F.

7. A process according to claim 6 wherein said hydrocarbon liquid is further heated to a temperature above the temperature of said extract prior to introduction into said second contacting zone.

8. A process according to claim 1 wherein the pressure in said first contacting zone is within the range of 500 to 1000 p.s.i.g. and the pressure in said second contacting zone is within the range of 1000 to 3000 p.s.i.g.

9. A process according to claim 1 wherein a part of said separated hydrocarbon liquid phase is passed into direct countercurrent contact with said residual brine separated from said extract thereby cooling said brine and preheating said hydrocarbon liquid.

10. A process according to claim 9 wherein said residual brine is further cooled by direct countercurrent contact with relatively cool hydrocarbon liquid from said first contacting zone at the pressure of said first contacting zone, and resulting preheated hydrocarbon is returned to said first contacting zone.

11. A process according to claim 1 wherein said separated water is subjected to pressure reduction and passed into direct countercurrent contact with relatively cool hydrocarbon liquid from said first contacting zone thereby cooling said water and heating said hydrocarbon liquid, said resulting heated hydrocarbon liquid is returned to said first contacting zone.

12. A process according to claim 1 wherein said hydrocarbon liquid consists essentially of hydrocarbons containing not less than 6 and not more than 30 carbon atoms per molecule.

References Cited
UNITED STATES PATENTS 2,298,791   10/1942   Harrington ---------- 208—311

JOSEPH SCOVRONEK, *Acting Primary Examiner.*

MORRIS O. WOLK, *Examiner.*

E. G. WHITBY, *Assistant Examiner.*